United States Patent [19]
Wood

[11] Patent Number: 6,012,078
[45] Date of Patent: Jan. 4, 2000

[54] CALCULATION UNIT

[76] Inventor: Lawson A. Wood, 873 N. Frederick St., Arlington, Va. 11105

[21] Appl. No.: 08/880,511

[22] Filed: Jun. 23, 1997

[51] Int. Cl.$^7$ .................................................. G06F 7/52
[52] U.S. Cl. .......................................... 708/620; 708/656
[58] Field of Search ................ 364/754.01, 753, 364/757, 758, 761, 764; 708/620, 606, 656

[56] References Cited

U.S. PATENT DOCUMENTS

| | | | |
|---|---|---|---|
| 3,684,879 | 8/1972 | Keehler ................................... | 708/656 |
| 3,852,581 | 12/1974 | Reynard et al. ......................... | 708/656 |
| 4,313,174 | 1/1982 | White ...................................... | 364/753 |
| 4,344,151 | 8/1982 | White ...................................... | 708/622 |
| 4,364,115 | 12/1982 | Asai ........................................ | 364/765 |
| 4,555,768 | 11/1985 | Lewis, Jr. et al. ....................... | 364/757 |
| 5,357,455 | 10/1994 | Sharangpani et al. .................. | 708/656 |
| 5,377,135 | 12/1994 | Kuroiwa .................................. | 708/656 |
| 5,404,324 | 4/1995 | Colon-Bonet ........................... | 364/761 |
| 5,422,805 | 6/1995 | McIntyre et al. ........................ | 364/757 |

*Primary Examiner*—David H. Malzahn
*Attorney, Agent, or Firm*—Venable; Allen Wood

[57] ABSTRACT

A multiplier uses squaring units to find the product of two binary numbers A and B by exploiting the algebraic expansion of $(A-B)^2$ or $(A+B)^2$. The squaring units may be look-up memories. However, to multiply extremely large numbers, each squaring unit may itself have look-up memories and additional components. A divider may be formed by using the multiplier to multiply trial quotients by a divisor and by comparing the product with a dividend. The trial quotient is formed by shifting a one through a sequence of bit positions and latching the one at bit positions such that the trial quotient times the divisor does not exceed the dividend.

17 Claims, 3 Drawing Sheets

CALCULATION UNIT

BACKGROUND OF THE INVENTION

The present invention is directed to a calculation unit, which may be configured as a multiplier or a divider for binary numbers.

Hardware adders are frequently encountered in digital circuitry. They can be fabricated using a reasonable number of gates. Hardware subtractors can also be found, frequently based on adders employing compliment arithmetic. However, since hardware circuitry for binary multiplication would require an excessive number of gates, the multiplication function is usually implemented by multiple additions or by the shift-and-add method. Because both of these techniques are relatively slow, a hardware multiplier would be desirable in order to execute multiplications rapidly.

Multiplication tables are nearly as old as civilization itself. Indeed, archeologists have found multiplication tables inscribed on clay tablets while excavating ancient ruins in the Middle East. In more modern times, multiplication tables from 0×0 through 9×9, along with an algorithm for using these tables to multiply numbers of virtually any size, are taught to gradeschool students.

It would seem to be a relatively straightforward task to make a hardware multiplier by using a look-up memory which stores a multiplication table. For example, half of the address pins of a ROM could receive a first binary number A, and the remaining half of the address pins could receive a second binary number B, with each storage location in the ROM storing the product of a particular value for A times a particular value for B. There is, however, a serious flaw in this approach—the number of memory locations required would expand rapidly as the number of bits in the numbers A and B increases. In other words, the number of bits in A and B must be relatively small if a ROM having a practical number of addressable locations is to be used.

SUMMARY OF THE INVENTION

An object of the invention is to provide a calculation unit for rapid multiplication and/or division.

Another object of the invention is to provide a calculation unit using look-up memories with relatively modest addresses spaces.

Another object of the invention is to provide a calculation unit which can operate on numbers with many bits.

Yet a further object of the invention is to provide a hardware multiplier and a hardware divider.

These and other objects of the invention, which will become apparent in the ensuing detailed description, can be attained by using look-up memories in a multiplier to store or otherwise encode a table of squares. Squares looked up by the memories can then be manipulated by adders and subtractors to find products. Such a multiplier can be used in a divider which additionally includes a trial quotient unit that supplies one of the input numbers to the multiplier, the other input number being the divisor, a dividend register which stores a dividend, and a comparator which compares the product found by the multiplier to the dividend in the dividend register.

In accordance with one aspect of the invention, a calculation unit comprises a first means for squaring a first number, a second means for squaring a second number, and a third means, which is connected to the first and second means, for finding the product of the first and second numbers.

DESCRIPTION OF THE PREFERRED EMBODIMENTS

Figure 1:
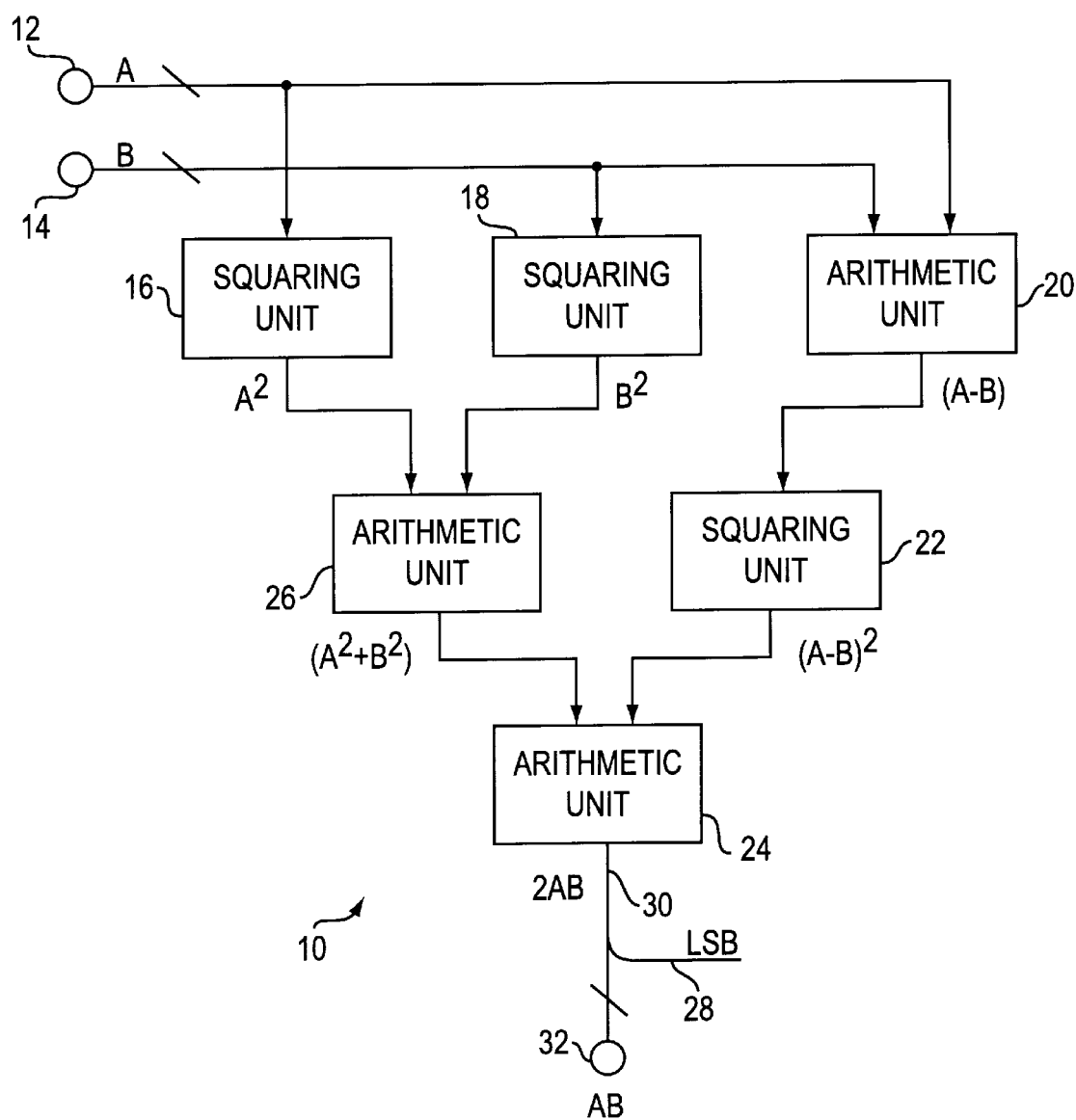
FIG. 1 is a block diagram schematically illustrating a first embodiment of a calculation unit in accordance with the present invention, configured as a multiplier.

FIG. 1 illustrates a calculation unit configured as a multiplier 10 for multiplying a binary number A which is applied to first input terminals 12 (only one of which is shown) by a second binary number B which is applied to second input terminals 14 (only one of which is shown). As will be discussed in more detail below, multiplier 10 exploits the algebraic expansion of the term $(A-B)^2$, which is equal to lass $A^2-2AB+B^2$. The binary number A is supplied to a squaring unit 16, which generates the binary number $A^2$ as its output. The squaring unit 16 may be a table look-up memory, such as a ROM (although an encoder which uses gates and/or switches to encode the number A into its square may be used instead of a ROM). The binary number B is supplied to a squaring unit 18, which may also be a table look-up memory. The squaring unit 18 generates a binary number $B^2$ as its output. The binary numbers A and B are both supplied to an arithmetic unit 20, such as a subtractor (which, as used herein, includes an adder which adds one of the numbers to the two's complement of the other). Arithmetic unit 20 generates the binary value (A–B) as its output, which is supplied to a squaring unit 22. The squaring unit 22, which may be a look-up memory, supplies the binary value $(A-B)^2$ to an arithmetic unit 24, such as a subtractor.

The binary numbers $A^2$ and $B^2$ from squaring units 16 and 18 are supplied to an arithmetic unit 26, here an adder, which supplies their sum $(A^2+B^2)$ to the arithmetic unit 24.

Since $(A-B)^2$ is equal to $A^2-2AB+B^2$, $A^2+B^2-(A-B)^2$ is equal to 2AB. The arithmetic unit 24 thus subtracts the binary number $(A-B)^2$ from unit 22 from the binary number $(A^2+B^2)$ from unit 26 to provide the binary value 2AB. This is double the product of the input numbers A and B but, since we are dealing with binary numbers, we can divide by 2 simply by dropping the least significant bit on a line 28 of a bus 30. The bus 30 thus conveys the product AB to output terminals 32 (only one of which is shown).

The advantage that multiplier 10 has over simply a single look-up memory (not illustrated) is that it can multiply much larger numbers. Suppose, for example, that the number A has 20 bits and that the number B also has 20 bits. If A and B were both supplied to the address input pins of a single look-up memory, the single memory would need to have about one thousand billion addressable storage locations. Such a memory is well beyond the capabilities of current technology. In contrast, the multiplier 10 could accommodate 20-bit input numbers using memories with about a million addressable storage locations for the squaring units. Thus, at the cost of using three memories and three arithmetic units, multiplier 10 is able to save huge numbers of storage locations that would otherwise be needed if a single look-up memory were employed.

Figure 2:
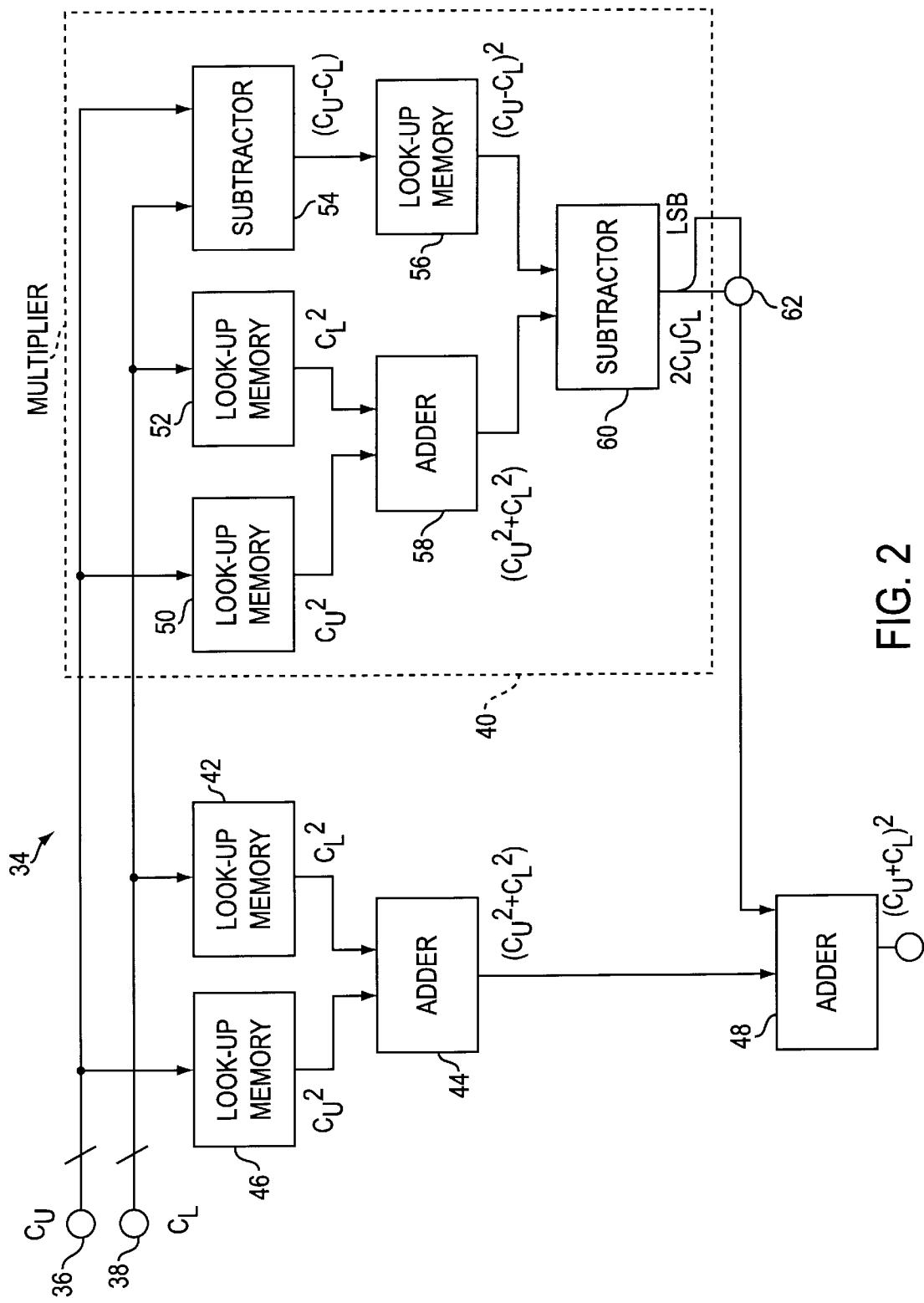
FIG. 2 is a block diagram schematically illustrating an embodiment of a squaring unit for use in the calculation unit of FIG. 1.

It will be apparent that the multiplier 10, as described above, could readily be modified to rely on the algebraic expansion of $(A+B)^2$ instead of $(A-B)^2$. Since $(A+B)^2=A^2+2AB+B^2$, $2AB=(A+B)^2-(A^2+B^2)$. Thus, arithmetic unit 20 could be changed to an adder which produces the number $(A+B)$, which would be squared by the squaring unit 22. Arithmetic unit 26 would then subtract $(A^2+B^2)$ from $(A+B)^2$. Instead of using look-up memories for the squaring units 16, 18, and 22 in FIG. 1, one can use squaring units 34, as shown in FIG. 2, in order to multiply really large numbers, ones that are larger than the number of addressable storage locations that are currently available in a single look-up memory. In FIG. 2, a large binary number $$C = c_{2n-1}, \ldots, c_n, c_{n-1}, \ldots, c_1, c_0$$

is divided into upper and lower portions $C_U$ and $C_L$. Here, $C_L$ is the lowest n bits of C, $$C_L = c_{n-1}, \ldots, c_1, c_0$$

and $C_U$ is the upper n bits, followed by n zeros.

$$C_U = c_{2n-1}, \ldots, c_n, 0,0,0, \ldots, 0.$$

In effect, $C_U$ is what is left of C after the n lowest-order bits (which form $C_L$) are removed and replaced by zeros. Dividing C into two portions in this way permits one to square it without needing a look-up memory having $2^{2n}$ addressable storage locations, as will be discussed below.

In FIG. 2, the binary number $C_U$ is received by first input terminals 36 (only one of which is shown) and the binary number $C_L$ is received by second input terminals 38 (only one of which is shown). $C_U$ and $C_L$ are both supplied to a multiplier 40. The number $C_L$ is also supplied to a look-up memory 42, which provides the number $C_L^2$ to an adder 44. The number $C_U$ is supplied to a look-up memory 46, which supplies $C_U^2$ to adder 44. The adder 44 supplies the sum $(C_U^2+C_L^2)$ to an adder 48, which also receives the product $2C_UC_L$ from multiplier 40. The output of adder 48 is $(C_U+C_L)^2$, or simply $C^2$.

Squaring unit 34 exploits the algebraic expansion of $(A+B)^2$, where A is replaced by $C_U$ and D is replaced by $C_L$. Thus, $$C^2 = (C_U+C_L)^2 = C_U^2 + 2C_UC_L + C_L^2.$$

The following example is provided to illustrate the operation of squaring unit 34. Although the number of bits is small in this example, it will be apparent that the same rationale applies when the number of bits is large.

Suppose C has only four bits, so that $C_L$ has two bits and $C_U$ has two zeros preceded by what might be called two "active" bits. Since $C_L$ has two bits in this example, memory 42 would need four memory locations, each storing the binary value shown in the following Table 1:

TABLE 1

| Address | Decimal Equivalent | Decimal Equivalent Squared | Binary Valve Stored |
|---|---|---|---|
| 0 0 | 0 | 0 | 0000 |
| 0 1 | 1 | 1 | 0001 |
| 1 0 | 2 | 4 | 0100 |
| 1 1 | 3 | 9 | 1001 |

Since, in this example, $C_u$ only has two active bits, followed by two zeros, the memory 46 also needs only four storage locations. However, the values they store reflect both the two active bits and the two added zeros of $C_U$, as shown in the following Table 2:

TABLE 2

| Address | Added Zeros | Decimal Equivalent | Decimal Equivalent Stored | Binary Value |
|---|---|---|---|---|
| 0 0 | 0 0 | 0 | 0 | 00 000 000 |
| 0 1 | 0 0 | 4 | 16 | 00 010 000 |
| 1 0 | 0 0 | 8 | 64 | 01 000 000 |
| 1 1 | 0 0 | 12 | 144 | 10 010 000 |

As will be apparent from Table 2, what is stored in memory 46 in this example is the squares of the active bits of $C_U$, followed by four zeros. In the more general case, what would stored in memory 46 would be the squares of the active bits in $C_U$, followed by twice the number of low-order zeros in $C_U$ (that is, followed by two zeros for each bit of $C_U$). It will be apparent that, instead of actually storing the low-order zeroes in memory 46, along with the squares of the active bits, the squares alone can be stored if their bit ranks are advanced in accordance with the number of low-order zeros when the squares are supplied to adder 44.

Multiplier 40 includes a look-up memory 50 which squares $C_U$, a look-up memory 52 which squares $C_L$, and a subtractor 54 which finds their difference. A look-up memory 56 finds the square of their difference, and an adder 58 finds the sum of the squares. Finally, a subtractor 60 finds the product $2C_UC_L$. In conformity to FIG. 1, FIG. 2 shows the least significant bit as being removed before the rest of the product is supplied to output terminals 62 (only one of which is shown), but since the number $2C_UC_L$ is needed by adder 48, the drawing shows the least significant bit as being added back at terminal 62. This has no practical significance, however, since the least significant bit will always be zero, and thus one can drop the least significant bit or not with impunity so long as the bit ranks of the remaining bits (that is, the proper powers of 2) are observed when the remaining bits are supplied to adder 48.

In summary, in order to use the squaring unit of 34 to find the square of a large binary number for use in the multiplier in FIG. 1, one breaks the large binary number into upper and lower parts and then relies on the algebraic expansion of the sum of the parts to find the square of the large number. It will be apparent that this technique can be carried further. If the upper and lower parts are, themselves, large, they (that is, the upper and lower parts) can also be broken into their own upper and lower parts. That is, an enlarged squaring unit of the type shown in FIG. 2 could be based on FIG. 2, with the individual look-up memories being replaced by squaring units in accordance with FIG. 2.

Figure 3:
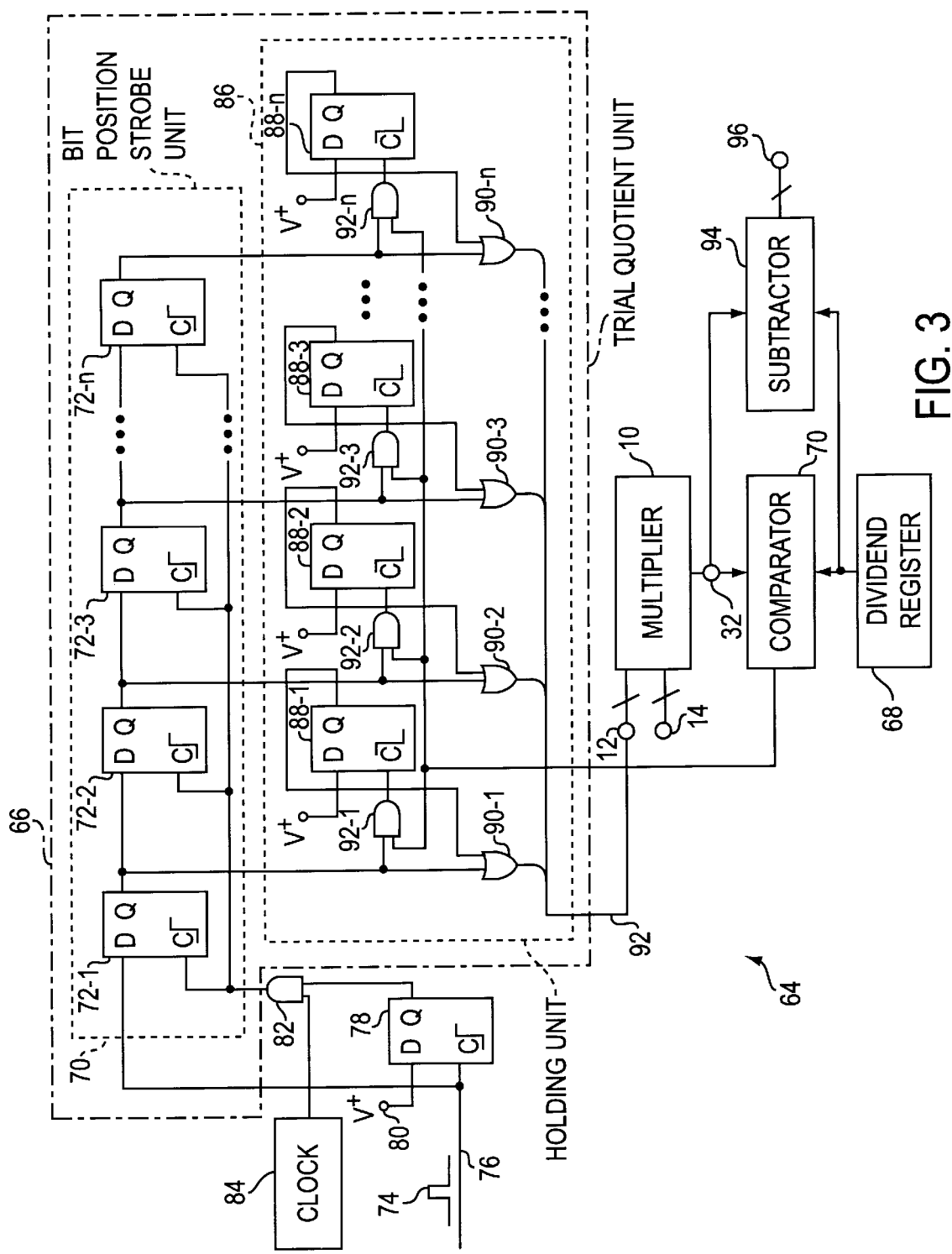
FIG. 3 is a block diagram schematically illustrating a calculation unit in accordance with another embodiment, configured as a divider.

FIG. 3 illustrates a calculation unit configured as a divider 64. It includes a trial quotient unit 66 which supplies a binary trial quotient to the input terminals 12 of multiplier 10. The multiplier 10 multiplies the trial quotient by a binary divisor that is supplied to input terminals 14. The product of the trial quotient and the divisor appears at output terminals 32. A dividend is stored in a dividend register 68, and a comparator 70 compares the dividend with the product of the divisor and the trial quotient. The output of comparator 70 is digitally low if the product from multiplier 10 is larger than the dividend stored in register 68. Conversely, if the dividend stored in register 68 is larger than the product from multiplier 10 or is equal to the product, the output of comparator 70 is digitally high.

The trial quotient unit 66 includes a bit position strobe unit 70 that is the same as the bucket-brigade circuit shown on page 286 of Don Lancaster's book, *CMOS Cookbook*, 1st Ed., 1977. The bit position strobe unit 70 includes D-type flip-flops 72-1, 72-2, 72-3, . . . , 72-n, which are cleared to zero before operation begins. The D input of the first flip-flop 72-1 receives a start pulse 74 that is applied to a line 76. The line 76 is connected to the clock input of a D-type flip-flop 78, whose D input is connected to a terminal 80 which is maintained at a digitally high potential. Flip-flop 78 is clocked at the rising edge of the clock signal (here, the start pulse 74), as is indicated by the forward-Z symbol shown adjacent the clock input in FIG. 3. Thus, at the rising edge of the start pulse 74, the Q output of flip-flop 78 becomes high and stays high thereafter. The Q output of flip-flop 78 is connected to one input of an AND gate 82. A clock signal supplied by a clock generator 84 is connected to the other input of AND gate 82. Accordingly, the AND gate 82 passes the clock signal to the clock inputs of flip-flops 72 after the start pulse 74 has been supplied.

The start pulse 74 is long enough that the D input of flip-flop 72-1 remains high until the first time that the clock signal turns AND gate 82 ON. As a result, the Q output of flip-flop 72-1 becomes high. This is passed to the Q output of flip-flop 72-2 at the rising edge of the next clock pulse and, furthermore, the Q output of flip-flop 72-1 becomes low. In a similar manner, the digitally high value is passed from flip-flop to flip-flop, in bucket-brigade fashion, until the Q output of flip-flop 72-n finally becomes high.

The trial quotient unit 66 also includes a holding unit 86. It includes D-type flip-flops 88-1, 88-2, 88-3, . . . , 88-n, which are also cleared to zero before operation begins. The D inputs of flip-flops 88 are connected to terminals that are maintained at a digitally high potential. The Q outputs are connected to OR gates 90-1, 90-2, 90-3, . . . , 90-n. The outputs of AND gates 92-1, 92-2, 92-3, . . . , 92-n are connected to the clock inputs of flip-flops 88. These flip-flops are clocked at the falling edge of the signal supplied to their clock inputs, as is indicated by the backward-Z symbols shown adjacent the clock inputs in FIG. 3. One input of each of the AND gates 92 is connected to the output of comparator 70. The other input is connected to the Q output of the respective flip-flop 72. Thus, when the Q output of flip-flop 72-1 becomes high, for example, the Q output of flip-flop 88-1 also becomes high, but only if the output of comparator 70 is simultaneously high. Subsequently, the Q output of flip-flop 88-2 becomes high if the Q output of flip-flop 72-2 is high and the output of comparator 70 is also high, and so forth for the remaining flip-flops 88.

During operation, the divisor is applied to terminals 14, the dividend is stored in register 68, and the digital value supplied by trial quotient unit 66 to terminals 12 is zero before the start pulse 74. The output of comparator 70 is thus low, and AND gates 92 are OFF. After the start pulse 74, the Q output of flip-flop 72-1 becomes high, and this is passed by OR gate 90-1 to a bus 92 that is connected to the terminals 12. The remaining OR gates 90 are OFF. The bus 92 thus carries to terminals 12 the trial quotient 1 00 . . . 0. Multiplier 10 multiplies the divisor by this trial quotient; the clock signal is slow enough that the product appears at terminals 32 while OR gate 90-1 is still ON. If the product at terminals 32 is larger than the dividend, comparator 70 outputs a low value and AND gate 92-1 remains OFF. Thereafter, the Q output of flip-flop 72-2 becomes high, and this is passed by OR gate 90-2 to bus 92. The trial quotient is now 010 . . . 0. This is again multiplied by the divisor and compared with the dividend, and if the product of the trial quotient and the divisor is still larger than the dividend, then the output of comparator 70 remains low and AND gate 92-2 remains OFF. The Q output of flip-flop 72-3 then becomes high, making the trial divisor 001 0 . . . 0. This process continues for subsequent pulses of the clock signal.

And now let us return to flip-flop 72-1, and the trial quotient 1 000 . . . 0. If the product of this trial quotient and the divisor is less than the dividend or equal to the dividend, then the output of comparator 70 becomes high. This means that the AND gate 92-1 turns ON when the Q output of flip-flop 72-1 becomes high, and consequently flip-flop 88-1 keeps OR gate 90-1 ON, even after the Q output of flip-flop 72-1 becomes low. The trial divisor has thus acquired 1 as its most significant bit.

When the Q output of flip-flop 72-2 becomes high, the trial divisor is 11 00 . . . 0. If the dividend is smaller than the product of this trial quotient and the divisor, at the next clock pulse the trial quotient becomes 10 1 0 . . . 0. However, if the dividend is still greater than or equal to the product of the divisor and the trial quotient 11 00 . . . 0, flip-flop 88-2 turns on and the trial quotient thereby permanently acquires 1 in the second most significant bit position. When flip-flop 72-3 turns on as a result of the next clock pulse, the trial quotient thus becomes 111 0 . . . 0. This process continues for subsequent clock pulses.

What happens, then, is that the trial quotient begins at 1 000 . . . 0. It grows larger if the trial quotient times the divisor is less than the dividend and grows smaller if the trial quotient times the divisor is greater than the dividend. The reason for this is that, as a digital one is shifted through bit position strobe unit 70, the holding unit 86 latches the digital one at bit positions such that the product determined by a multiplier 10 does not exceed the dividend. The comparator 70 may turn on and off numerous times during this procedure, but by the time the digital one shifts out of bit position strobe unit 70, the trial quotient will have converged on the true quotient and, at most, will differ from the dividend by only a remainder.

Consequently, at the end of the process, the true quotient appears at terminals 12. The remainder is found by a subtractor 94, which subtracts the product of the quotient and the divisor from the dividend, and supplies the remainder bits to terminals 96 (only one of which is shown). The value appearing on terminals 96 represents the remainder only after a digital one has been shifted through all the positions of the bit position strobe unit 70.

Although divider 64 employs multiplier 10, a single look-up memory could be used instead if the numbers involved do not require the high capacity of multiplier 10, or the multiplier 10 could be supplemented with squaring units 34 if even higher capacity is needed.

Although the multipliers and divider disclosed above have been discussed in terms of hardware, it will be apparent that they can also be implemented via software, in which case the squaring units will comprise random access memory.

It should be noted that divider 64 can be used to inspect the dividend loaded into register 68 for prime factors if a sequence of prime numbers, perhaps read out of a prime number memory (not shown), is supplied to terminals 14 as the dividend. A remainder of zero indicates that a prime factor has been found.

It should also be understood that the above description of the present invention is susceptible to various modifications, changes, and adaptations, and the same are intended to be comprehended within the meaning and range of equivalents of the appended claims.

What I claim is:

1. A calculation unit, comprising:

first means for squaring a first number;

second means for squaring a second number; and third means, connected to the first and second means, for finding the product of the first and second numbers, the third means including a first arithmetic unit which receives the first and second numbers and provides their difference as an output, means receiving the output of the first arithmetic unit for squaring the difference between the first and second numbers, a second arithmetic unit which receives the square of the first number and the square of the second number and provides their sum as an output, and a third arithmetic unit which receives the sum of the squares of the first and second numbers and the square of the difference between the first and second numbers, the third arithmetic unit providing an output representing the product of the first and second numbers.

2. The calculation unit of claim 1, wherein the first means comprises a look-up memory.

3. The calculation unit of claim 1, wherein the first number is a binary number having an upper portion and a lower portion, and wherein the first means comprises fourth means for squaring the upper portion, fifth means for squaring the lower portion, and sixth means, connected to the fourth and fifth means, for finding the square of the first number.

4. The calculation unit of claim 3, wherein the sixth means comprises a multiplier which receives the upper and lower portions.

5. The calculation unit of claim 3, wherein the fourth means comprises a look-up memory.

6. The calculation unit of claim 1, wherein the first number is a divisor, and further comprising trial quotient means for generating a trial quotient, the trial quotient being the second number, and means for comparing the product of the first and second numbers with a dividend, the trial quotient means being connected to the means for comparing.

7. The calculation unit of claim 6, further comprising a subtractor to find the difference between the dividend and the product of the first and second numbers.

8. The calculation unit of claim 6, wherein the trial quotient means comprises bit position strobe means for passing a digital one through a plurality of bit positions, and holding unit means for selectively latching the digital one at different bit positions in response to a signal from the means for comparing.

9. A calculation unit, comprising:

a multiplier which receives a first number and a second number and which generates a product, the first number being a divisor;

means for storing a dividend;

trial quotient means for generating a trial quotient, the trial quotient being supplied to the multiplier as the second number; and means for comparing the product to the dividend, wherein the trial quotient means comprises bit position strobe means for passing a digital one through a plurality of bit positions, and holding unit means for selectively latching the digital one at different bit positions in response to a signal from the means for comparing.

10. The calculation unit of claim 9, wherein the multiplier comprises:

first means for squaring the first number;

second means for squaring the second number; and third means, connected to the first and second means, for finding the product.

11. The calculation unit of claim 10, wherein the first means comprises at least one look-up memory.

12. The calculation unit of claim 9, further comprising means for finding the difference between the product generated by the multiplier and the dividend stored by the means for storing.

13. A calculation unit, comprising:

a first squaring unit to square a first number;

a second squaring unit to square a second number;

a first arithmetic unit to find the difference between the first and second numbers;

a second arithmetic unit to find the sum of the square of the first number and the square of the second number;

a third squaring unit to square the difference between the first and second numbers; and a third arithmetic unit which finds the product of the first and second numbers from the sum of the squares of the first and second numbers and the square of the difference between the first and second numbers.

14. The calculation unit of claim 13, wherein the first squaring unit comprises a look-up memory.

15. The calculation unit of claim 14, wherein the look-up memory comprises a ROM.

16. The calculation unit of claim 13, wherein the first number is a binary number having upper and lower portions, and wherein the first squaring unit comprises a look-up memory which receives the first portion and a look-up memory which receives the second portion.

17. The calculation unit of claim 13, wherein the first squaring unit comprises a first look-up ROM that stores a table of squares, the second squaring unit comprises a second look-up ROM that stores the table of squares, the third squaring unit comprises a third look-up ROM that stores the table of squares, and the first arithmetic unit comprises a subtractor.

* * * * *